United States Patent
Matano et al.

(10) Patent No.: US 8,240,763 B2
(45) Date of Patent: Aug. 14, 2012

(54) LUMBAR SUPPORT MECHANISM FOR VEHICLE

(75) Inventors: Kunihiko Matano, Saitama (JP); Koichi Nozoe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 12/603,305

(22) Filed: Oct. 21, 2009

(65) Prior Publication Data

US 2010/0141001 A1 Jun. 10, 2010

(30) Foreign Application Priority Data

Dec. 8, 2008 (JP) ................................. 2008-312224

(51) Int. Cl.
 *A47C 7/46* (2006.01)
(52) U.S. Cl. ............... 297/284.1; 297/284.4; 297/284.6; 297/284.8; 297/284.9
(58) Field of Classification Search ............... 297/284.1, 297/284.4–284.9
 See application file for complete search history.

(56) References Cited

U.S. PATENT DOCUMENTS

| | | | | | |
|---|---|---|---|---|---|
| 3,724,797 | A | * | 4/1973 | Freitag et al. | 248/593 |
| 4,354,709 | A | * | 10/1982 | Schuster | 297/284.4 |
| 5,022,105 | A | * | 6/1991 | Catoe | 5/11 |
| 5,553,919 | A | * | 9/1996 | Dennis | 297/284.8 |
| 5,658,050 | A | * | 8/1997 | Lorbiecki | 297/452.41 |
| 5,975,629 | A | * | 11/1999 | Lorbiecki | 297/200 |
| 6,007,150 | A | * | 12/1999 | Clerkin et al. | 297/215.12 |
| 6,224,081 | B1 | * | 5/2001 | Wayman et al. | 280/288.4 |
| D497,332 | S | * | 10/2004 | Sugimoto et al. | D12/114 |
| 7,458,637 | B2 | * | 12/2008 | Norman et al. | 297/284.4 |
| 7,604,292 | B1 | * | 10/2009 | Reading | 297/215.12 |
| 7,651,112 | B2 | * | 1/2010 | Ozawa | 280/304.5 |
| 7,850,225 | B2 | * | 12/2010 | Nobuhira et al. | 296/191 |
| 2005/0121953 | A1 | * | 6/2005 | Sprouse | 297/199 |
| 2007/0216132 | A1 | * | 9/2007 | Ozawa | 280/304.5 |
| 2008/0093146 | A1 | * | 4/2008 | Kobayashi | 180/219 |
| 2011/0101749 | A1 | * | 5/2011 | Shih | 297/284.7 |

FOREIGN PATENT DOCUMENTS

| JP | 5-3076 Y2 | 1/1993 |
|---|---|---|
| JP | 2001-315678 A | 11/2001 |

* cited by examiner

*Primary Examiner* — Laurie Cranmer
(74) *Attorney, Agent, or Firm* — Birch, Stewart, Kolasch & Birch, LLP

(57) ABSTRACT

A lumbar support mechanism includes a damper having one end supported by the inside of a seat back and the other end capable of extension and contraction. Seesaw links are provided with each having one end connected to the other end and capable of extension and contraction. An intermediate portion is supported at a swing fulcrum by the seat back with the other end extending in the width direction of the seat back, and swung around the swing fulcrum. Pantograph links are connected to the respective seesaw links and are movable up and down in the back and forth direction in conjunction with the swing of the corresponding seesaw links. The lock-release lever is operated to release the lock mechanism of the damper. The extension and contraction force of the damper is transmitted to the pantograph links via the corresponding seesaw links with the pantograph links shifting the pad provided in the seat back.

20 Claims, 11 Drawing Sheets

LUMBAR SUPPORT MECHANISM FOR VEHICLE

CROSS-REFERENCE TO RELATED APPLICATIONS

The present application claims priority under 35 USC 119 to Japanese Patent Application No. 2008-312224 filed on Dec. 8, 2008 the entire contents of which are hereby incorporated by reference.

BACKGROUND OF THE INVENTION

1. Field of the Invention

The present invention relates to a lumbar support mechanism for a vehicle provided with a seat on which an occupant sits and a seat back for supporting the back of the occupant.

2. Description of Background Art

Some motorcycles are provided with a backrest mechanism adjustable for the position of a backrest. See, for example, Japanese Patent Laid-Open No. 2001-315678. This backrest mechanism provides a movable backrest with an elongate member extending toward a raised portion. The raised portion is provided with a void, in which a receiving portion for the elongate member is provided. In the state where a driver has dismounted from the vehicle, while an elongate member is being slid, the position of the movable backrest is adjusted and positioned at an optimal position by means of a bolt or the like. Although backrest mechanisms are available for motorcycles, a lumbar support mechanism capable of adjusting a lumbar spine support position has not been devised. If this backrest mechanism is intended to be applied to a lumbar support mechanism, it is difficult to minutely adjust a lumbar spine support position by the method of manually adjusting the position of the backrest in the state where the rider has dismounted from the vehicle. Thus, it is desired to improve the operability of the backrest. In addition, since the elongate member and the like which are large-sized components are disposed externally of the seat, such a mechanism requires an increase in size.

On the other hand, a lumbar spine support device (substantially corresponding to a lumbar support mechanism) is known that is provided on the backrest lower portion of an automobile seat. See, for example, Japanese Utility Model Publication No. Hei 5-3076. This device includes a base fixedly welded to a seat back frame; a lumbar spine support member supported by the base via a link mechanism so as to be movable forward and rearward; a pair of compression coil springs provided between the base and the lumbar spine member so as to anteriorly bias the lumbar spine support member; and a friction lock mechanism having one end attached to the base and the other end attached to the lumbar spine support member or the link mechanism.

The friction lock mechanism is configured to include a cylinder; a rod inserted into the cylinder so as to be axially movable; a braking member adapted to prevent the movement of the rod while it is wound around the rod and to permit the movement of the rod while it is operated to release the winding; and an operating member for lock-release capable of operation in the direction of releasing the winding of the braking member around the braking member.

The configuration described in Japanese Utility Model Publication No. Hei 5-3076 increases the number of component parts since the spring adapted to push out the lumbar support member (hereinafter, called the pad) and the lock mechanism for specifying the position of the pad are separate from each other. Thus, it is not suitable for small-sized and lightweight vehicles, particularly, such as motorcycles.

Although the lock mechanism locks the link mechanism, it does not lock the springs. Therefore, even in the locking state, the pad may not be supported stably because of an inclination or the like depending on the application of force. More specifically, since the pad is swingably connected to the link member and is biased by the pair of springs, if force is applied to a portion of the pad, the pad is easily swung. Further, since the base is welded to the seatback frame, attachment-detachment work of the mechanism is cumbersome.

SUMMARY AND OBJECTS OF THE INVENTION

The present invention has been made in view of the foregoing and it is an object of an embodiment of the present invention to provide a lumbar support mechanism that is relatively small in size for use with lightweight vehicles such as motorcycles and that can prevent the undesirable movement of a pad at the time of locking.

To achieve the above problem, according to an embodiment of the present invention a vehicle includes a seat on which an occupant sits and a seat back for supporting a back of the occupant with the seat back being internally provided with a lumbar support mechanism capable of adjusting a support position. The lumbar support mechanism includes a damper having one end supported by the inside of the seat back and the other end capable of extension and contraction. A pair of left and right seesaw links are provided with each having one end connected to the other end to be capable of extension and contraction of the damper. An intermediate portion is supported at a swing fulcrum by the inside of the backseat, and the other end extends in a width direction of the seat back and swings around the swing fulcrum. A pair of X-shaped pantograph links are connected to the corresponding seesaw links and are movable up and down in a back and forth direction in conjunction with the swing of the seesaw links. A lock-release lever is adapted to release a lock mechanism of the damper wherein in a stage of adjusting the support position, the lock-release lever is operated to release the lock mechanism of the damper, the extension and contraction force of the damper is transmitted to the pantograph links via the corresponding seesaw links, and the pantograph links shift a pad provided in the seat back in a back and forth direction.

According to an embodiment of the present invention, if the damper is locked, the operation of the seesaw links and of the pantograph links is fixed to also fix the pad supported by the pantograph links. Therefore, it is possible to prevent the undesirable movement of the pad during the locking. In addition, it is possible to thin the links and reduce the widths of the links, thereby downsizing the lumbar support mechanism.

In the configuration described above, the lumbar support mechanism may be supported by a base plate, and the base plate may be removably attached to the vehicle. According to this configuration, the constituent parts of the lumbar support mechanism can be assembled with ease. In addition, the lumbar support mechanism can easily be attached to and removed from the vehicle body by attaching and removing the base plate.

In the configuration described above, the lumbar support mechanism may be provided on a seat back plate. According to this configuration, it is possible to reduce component parts required for attachment according to the use of the seat back plate usually possessed by a vehicle equipped with a seat. In addition, the lumbar support mechanism can be applied to any vehicle.

In the configuration described above, the lumbar support mechanism may be provided forward of a front wall of a trunk. According to this configuration, the lumbar support mechanism can be disposed using the space forward of the trunk.

In the configuration described above, the lumbar support mechanism may be provided in the seat back of a passenger seat, and the lock-release lever may be provided in the vicinity of a grab rail. According to this configuration, the lock-release lever can be operated by the occupant that remains sitting on the passenger seat.

In the present invention, the lumbar support mechanism includes the damper having one end supported by the inside of the seat back and the other end capable of extension and contraction; the pair of left and right seesaw links each having one end connected to the other end, capable of extension and contraction, of the damper, the intermediate portion supported at a swing fulcrum by the inside of the seat back, and with the other end extending in a width direction of the seat back and swinging around the swing fulcrum. The pair of X-shaped pantograph links are connected to the corresponding seesaw links and are movable up and down in a back and forth direction in conjunction with the swing of the seesaw links. The lock-release lever is adapted to release a lock mechanism of the damper wherein in the stage of adjusting the support position, the lock-release lever is operated to release the lock mechanism of the damper, the extension and contraction force of the damper is transmitted to the pantograph links via the corresponding seesaw links, and the pantograph links shift a pad provided in the seat back in the back and forth direction. Thus, it is possible to prevent the undesirable movement of the pad during the locking. In addition, the lumbar support mechanism can be made small in size and suitable for relatively small and lightweight vehicles such as motorcycles or the like.

The lumbar support mechanism is supported by the base plate, which is removably attached to the vehicle. Therefore, the assembly of the constituent parts of the lumber support mechanism and the attachment and detachment from the vehicle can be facilitated.

Since the lumbar support mechanism is provided on the seat back plate, the component parts of the lumber support mechanism can be reduced and the lumber support mechanism can be attached to any vehicle.

Since the lumbar support mechanism can be provided forward of the front wall of the trunk, it can be attached to small-sized and lightweight vehicles such as motorcycles having less layout space.

The lumbar support mechanism is provided in the seat back of the passenger seat and the lock-release lever is provided in the vicinity of the grab rail. Therefore, the lock can be released by the occupant remaining sitting on the passenger seat and the support position can be adjusted by her or his own hips, so that the excellent operability can be ensured.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will hereinafter be described with reference to the accompanying drawings.

Figure 1:
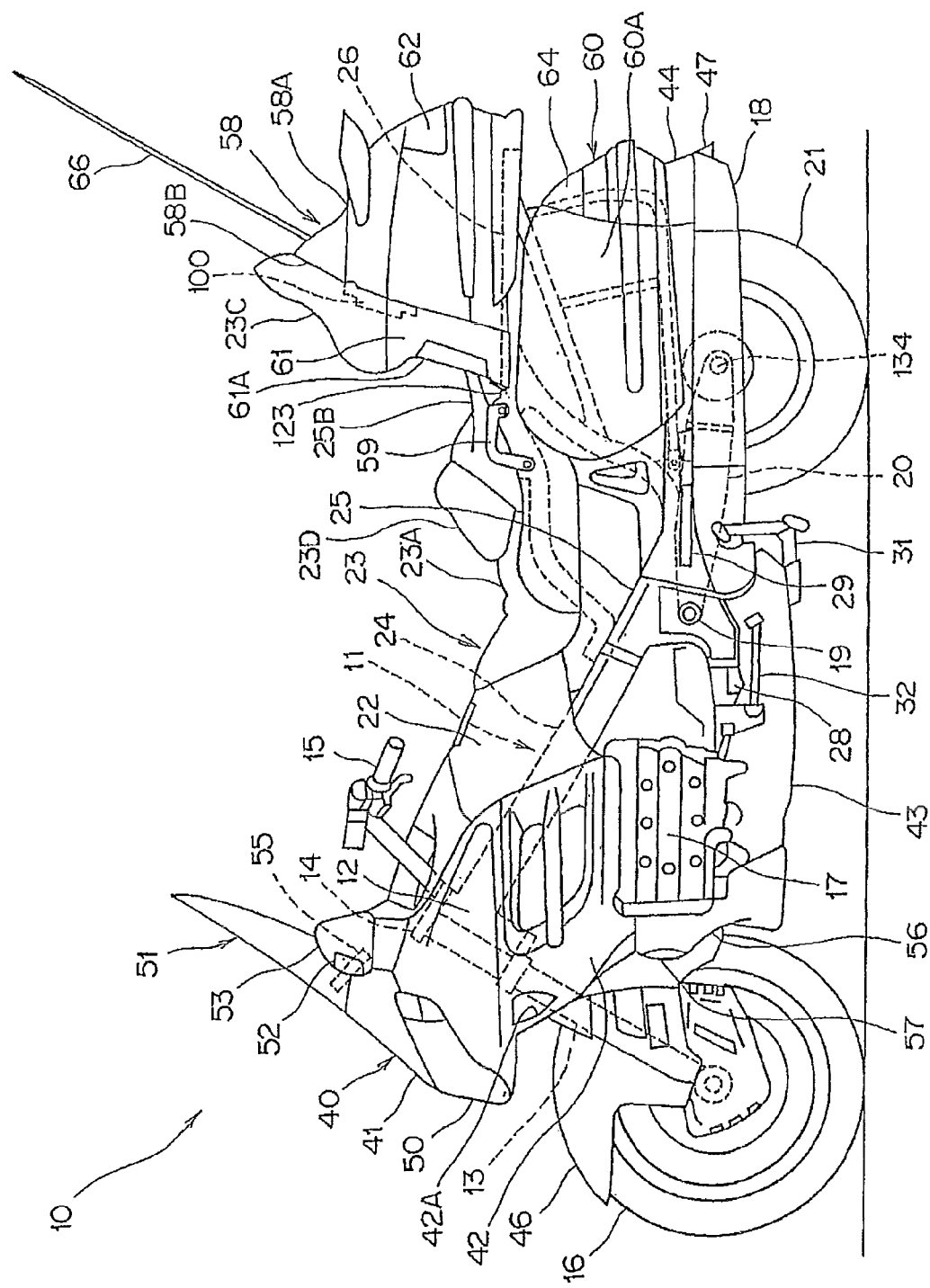
FIG. 1 is a lateral view of a motorcycle according to an embodiment of the present invention.
Figure 2:
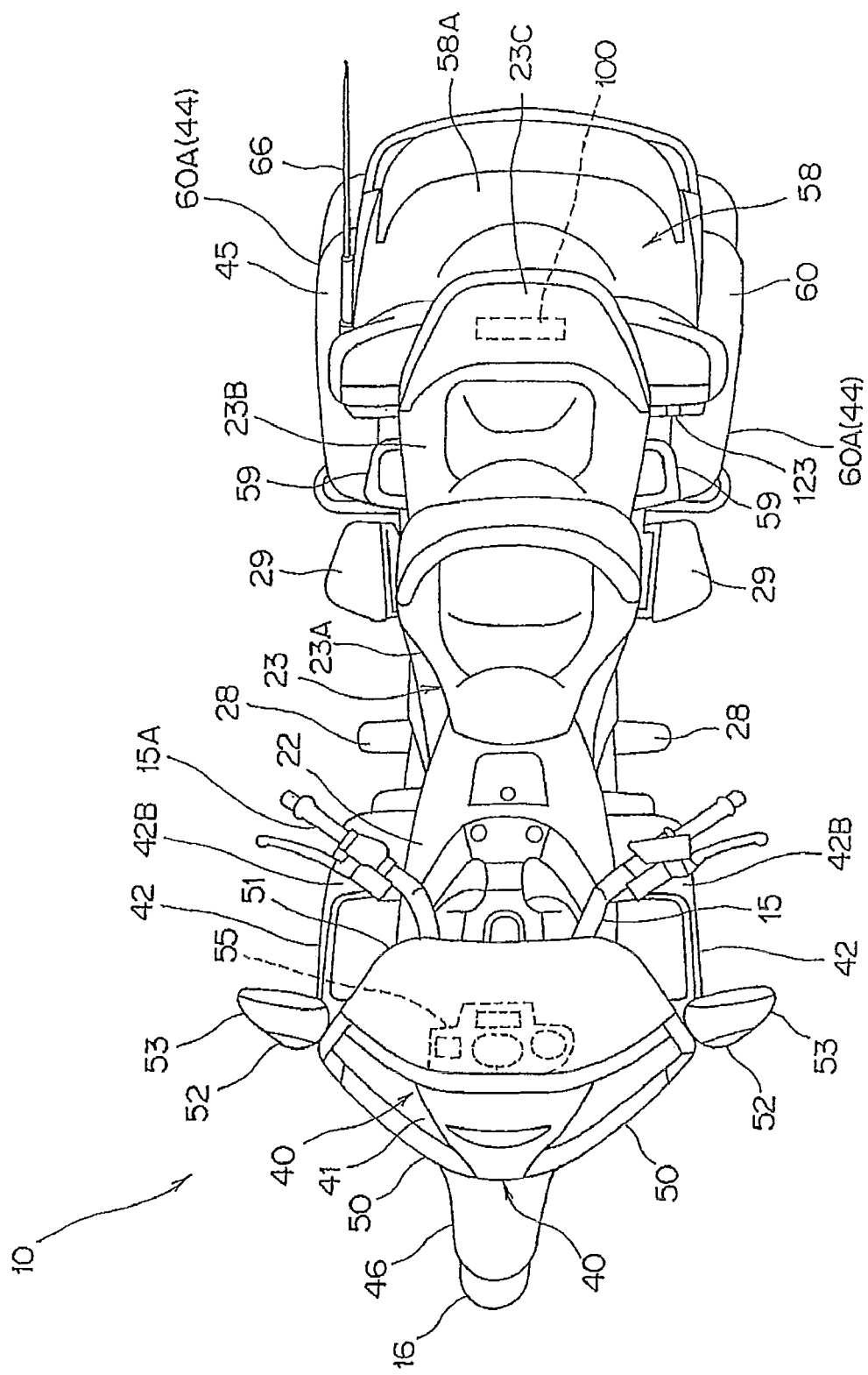
FIG. 2 is a plan view of the motorcycle.

Referring to FIGS. 1 and 2, the motorcycle 10 includes a body frame 11; a pair of left and right front forks 13 turnably supported by a head pipe 12 attached to the front end of the body frame 11; and steering handlebars 15 attached to a top bridge 14 supporting the front ends of the front forks 13. The motorcycle 10 further includes a front wheel 16 rotatably supported by the front forks 13; an engine 17 supported by the body frame 11; an exhaust muffler 18 connected to the engine 7 via an exhaust pipe (not illustrated); a swing arm 20 vertically swingably supported by a pivot shaft 19 extended through the rear lower portion of the body frame 11; a rear wheel 21 rotatably supported by the rear end of the swing arm 20; and rear shock absorbers (not illustrated) interposed between the swing arm 20 and the body frame 11.

The motorcycle 10 is provided with a body cowling 40 attached to the body frame 11 and the like to cover the vehicle body. The body cowling 40 includes a front fairing 41 covering the front of the vehicle body; a pair of left and right side covers 42 covering the sides of the vehicle body; an under cover 43 covering the lower portion of the vehicle body; and a rear seat cowl 44 covering the rear portion of the vehicle body. A front fender 46 is attached to the front forks 13 so as to cover the front wheel 16 from above. A rear fender 47 is attached to the rear seat cowl 44 so as to cover the rear wheel 21 from above.

A headlight 50 is provided on the front surface of the front fairing 41. A windscreen (windshield) 51 is installed above the headlight 50. Left and right rearview mirrors 53 incorporating front winkers 52 are respectively provided at left and right edges of the front fairing 41. As illustrated in FIG. 2, a vehicle meter 55 is disposed inside the front fairing 41. In FIG. 2, a pair of left and right air openings 42A is provided in the side covers 42. An engine guard 56 is provided and a pair of left and right fog lamps 57 mounted on the engine guard 56. A pair of left and right side upper covers 42B (see FIG. 2) are attached to the side covers 42 to cover between main frames 24 and corresponding side covers 42 so as to be exposed to the outside.

Figure 3:
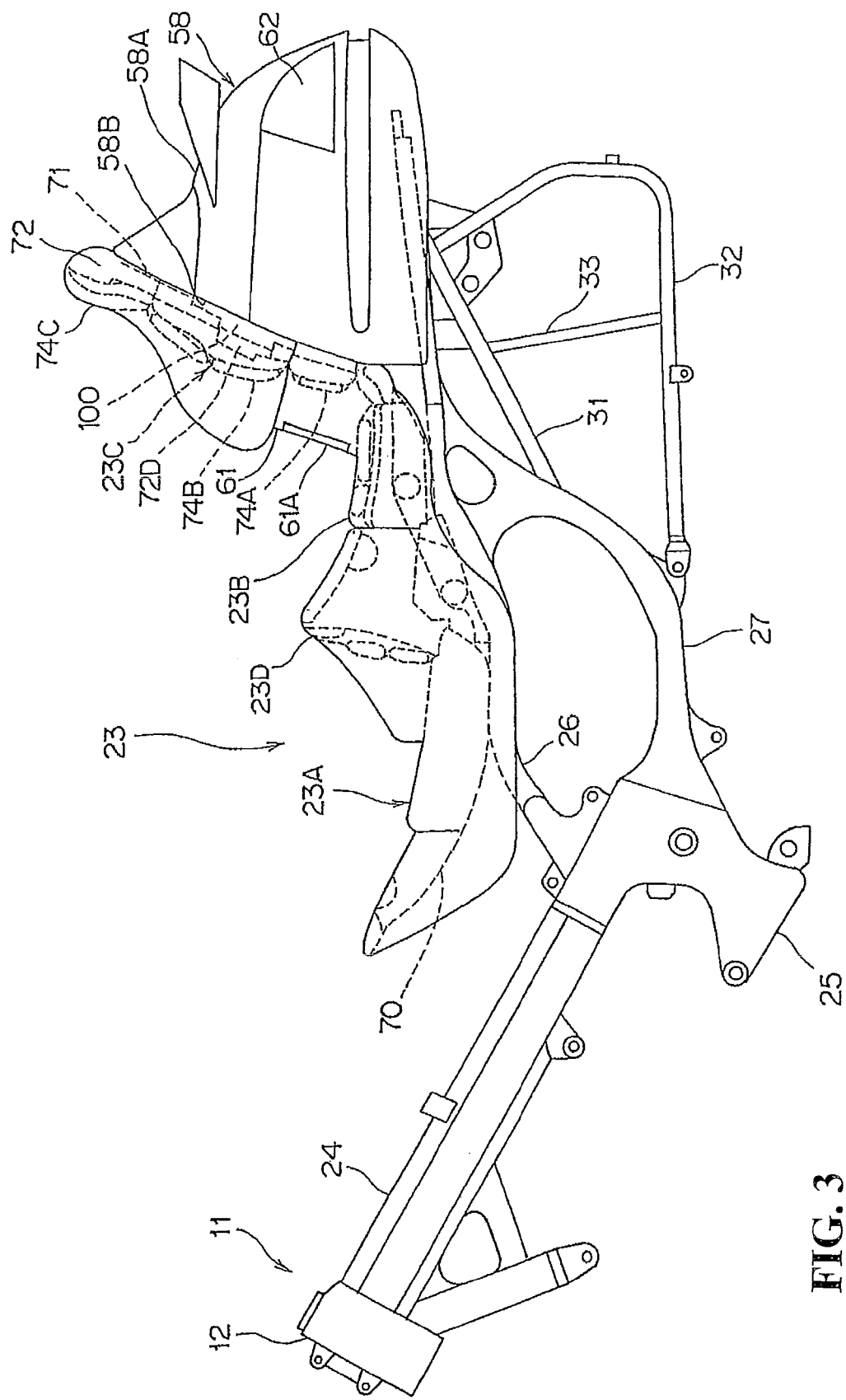
FIG. 3 illustrates a body frame along with its peripheral configuration.

FIG. 3 is a lateral view (a vehicle body left lateral view) illustrating the body frame 11 together with the peripheral configuration thereof.

The body frame 11 includes the pair of left and right main frames 24 branching right and left from the head pipe 12 and extending rearward and obliquely downward; a pair of left and right pivot plates 25 connected to the rear portions of the main frames 24; a pair of left and right seat rails 26 extending rearward and obliquely upward from the upper portions of the pivot plates 25; and a middle frame 27 connecting the rear end of the seat rail 26 with the intermediate portion of the pivot plate 25 and supporting the seat rail 26.

A vehicle body frame for reinforcing the rear portion is provided at a vehicle body rear portion. More specifically, a pair of left and right seat stays 31, a pair of left and right auxiliary stays 32, and a reinforcing stay 33 are provided. The seat stay 31 connects the rear portion of the seat rail 26 with the middle frame 27 and supports the rear portion of the seat rail 26. The auxiliary stay 32 extends obliquely downwardly from the rear portion of the seat rail 26 and then extends forwardly horizontally, and is connected to the middle frame 27. The auxiliary stay 33 is spanned between the seat stay 31 and the auxiliary stay 32.

As illustrated in FIG. 1, the engine 17 is suspended from the main frames 24 and a fuel tank 22 is supported above the main frames 24. The engine 17 is a horizontally opposed 6-cylinder water-cooled engine. An occupant seat 23 on which an occupant sits is supported by the front portion of the seat rails 26. A large-sized box-like trunk 58 and grab rails 59 are supported by the rear portions of the seat rails 26. The trunk 58 is provided on the rear portion of the occupant seat 23 and is formed in a substantially rectangle shape as viewed from above. An upper lid 58A is adapted to open and close the trunk 58. The grab rails 59 are provided on the left and right rear portions of the occupant seat 23 and grabbed by the occupant. A pair of left and right saddle bags 60 is mounted on the reinforcing stays 33 on the left and right of the vehicle body rear portions, respectively. The saddle bags 60 are each formed in a longitudinally elongated box-shape and have respective lateral walls 60A which are opened and closed. In addition, the saddle bags 60 also function as part of the rear seat cowl 44. A pair of left and right steps for rider 28 (foot rest steps for rider) is provided together with a pair of left and right steps for pillion passenger 29 (foot rest steps for pillion passenger).

The trunk 58 is provided with a pair of left and right trunk pockets 61 each formed like a small-sized box. The trunk pockets 61 protrude from the left and right of a front wall 58B of the trunk 58 and are located at the left and right rear portions of the occupant seat 23. In addition, the trunk pockets 61 have respective front lids 61A which open. The trunk pockets 61 are located on the left and right of a seat back 23C of the rear seat 23B. More specifically, the trunk pockets 61 are disposed at respective positions reached by a hand of the occupant (pillion passenger) sitting on the rear seat 23B so that the front lids 61A of the trunk pockets 61 can be opened and closed in the occupant's mounting state.

A pair of left and right tail lamp units 62 are disposed on the rear surface of the trunk 58. Rear blinkers 64 are disposed on the respective rear surfaces of the saddle bags 60. A rod antenna 66 is attached to the right side portion of the trunk 58. The rod antenna 66 functions as a radiobroadcast receiving antenna of an audio unit built in the motorcycle.

The occupant seat 23 includes a front seat (rider seat) 23A on which a driver sits, a rear seat (passenger seat) 23B which is continuous with the rear portion of the front seat 23A and on which a pillion passenger sits, and a seat back (also called a backrest) 23C for pillion passenger.

A seat back (also called a backrest) 23D for rider is provided between the front seat 23A and the rear seat 23B. This seat back 23D for the rider is not such a large-sized seat back as to function as a backrest for supporting the back of the rider sitting on the front seat 23A but a small-sized seat back capable of supporting the rider's lumbar back from rear.

Figure 4:
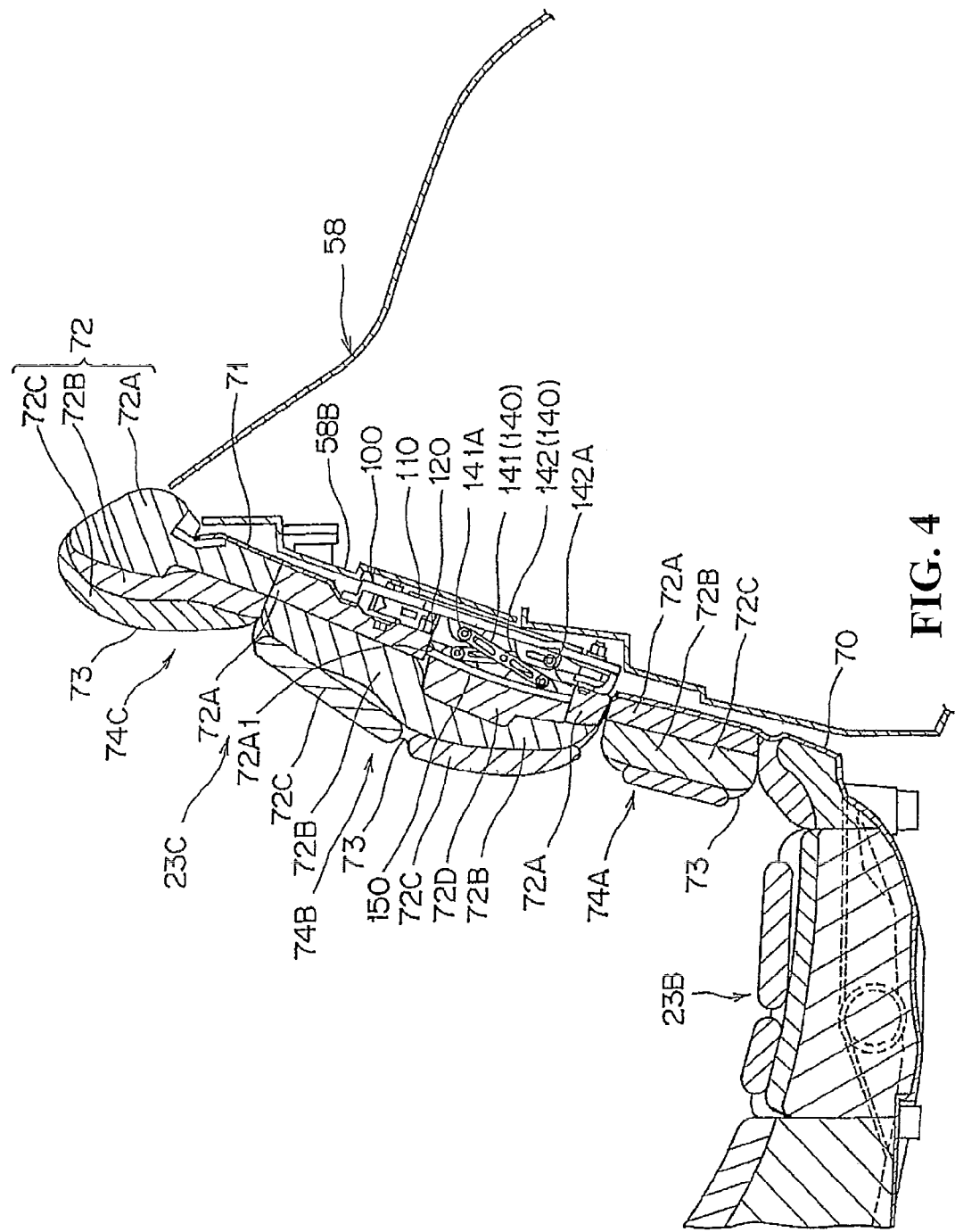
FIG. 4 illustrates an inner structure of a seat back (in a state of a lumber support mechanism whose pad is most retreated) along with its peripheral configuration.

FIG. 4 illustrates an inner structure of the seat back 23C together with its peripheral configuration.

The seat back 23C for pillion passenger is a large-sized seat back extending rearward upward along the front wall 58B of the trunk 58, terminating at a position slightly higher than the trunk 58 and functioning as a backrest for pillion passenger. In addition, the backrest 23C is adapted to support from rear almost the entire of a pillion passenger's back including a lumbar and a portion above the lumbar.

The seat back 23C has a seat back plate 71 functioning as a frame of the seat back 23C. The seat back plate 71 is fixedly attached to the front wall 58B of the trunk 58 by means of fastening members such as bolts or the like.

A surface skin 73 is laid on the seat back plate 71 via a cushion material 72 so as to cover the entire external surface of the seat back 23C. In addition, the surface skin 73 is made of a water-proof material. Thus, the seat back 23C is formed to prevent rainwater from entering the inside thereof. In addition, a seat back plate 70 is provided for the front seat 23A and for the rear seat 23B.

The seat back 23C includes a lower cushion section 74A, an intermediate cushion section 74B and an upper cushion section 74C. The lower cushion section 74A is adapted to support the pillion passenger's hips and their vicinities from rear. The intermediate cushion section 74B is adapted to support the lower back including at least the lumbar spine and its peripheries from the rear. The upper cushion section 74C is adapted to support a portion above the lumbar from rear. The cushion material 72 is formed of a urethane material. The cushion material 72 has a three-layer laminated cushion structure including a main body urethane (cushion main body) 72A laid as a lowest layer on the seat back plate 71; an intermediate layer urethane (an intermediate layer cushion) 72B laminated on the upper surface (the seat skin side) of the main body urethane 72A; and a surface layer urethane (a surface layer cushion) 72C laid on the seat surface layer side of the intermediate layer urethane 72B. In addition, the cushion material 72 has a divided cushion structure divided into the cushion sections 74A to 74C. This structure can provide cushion characteristics (cushion thickness, cushion hardness, cushion shape, etc.) depending on the supporting sections.

A lumbar support mechanism 100 which can adjust the support position of the pillion passenger's lumbar (including the lumbar spine) is built in the intermediate section 74B of the seat back 23C. More specifically, in the intermediate cushion section 74B, the main body urethane 72A is partially bored to form an opening portion 72A1, in which the lumbar support mechanism 100 is accommodated. Alternatively, the lumbar support mechanism 100 is disposed in front of the integral main body urethane 72A.

A divided urethane (divided cushion) 72D that is separate from the cushion materials 72 (72A to 72C) is disposed between the lumbar support mechanism 100 and the intermediate layer urethane 72B. Because of the arrangement of the divided urethane 72D, also between the lumbar support mechanism 100 and the surface skin 73, the three-layer laminated cushion structure can be provided and cushion characteristics suitable for lumbar support can be offered.

In addition, the seats 23A, 23B and 23D other than the back seat 23C are each formed to have almost the same structure as that of the back seat 23C except the built-in of the lumbar support mechanism 100.

Figure 5:
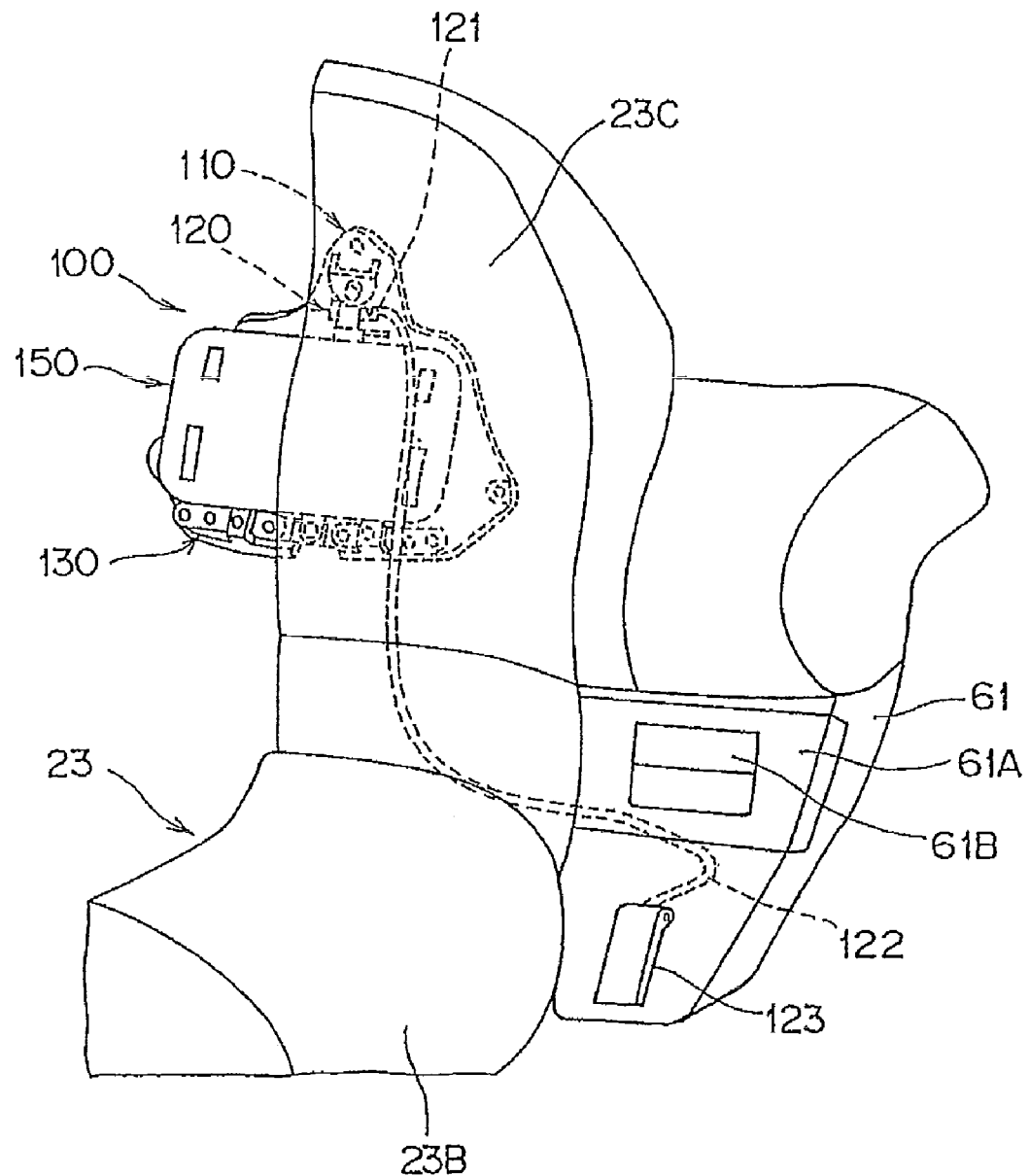
FIG. 5 illustrates the lumbar support mechanism along with the seat back.
Figure 6:
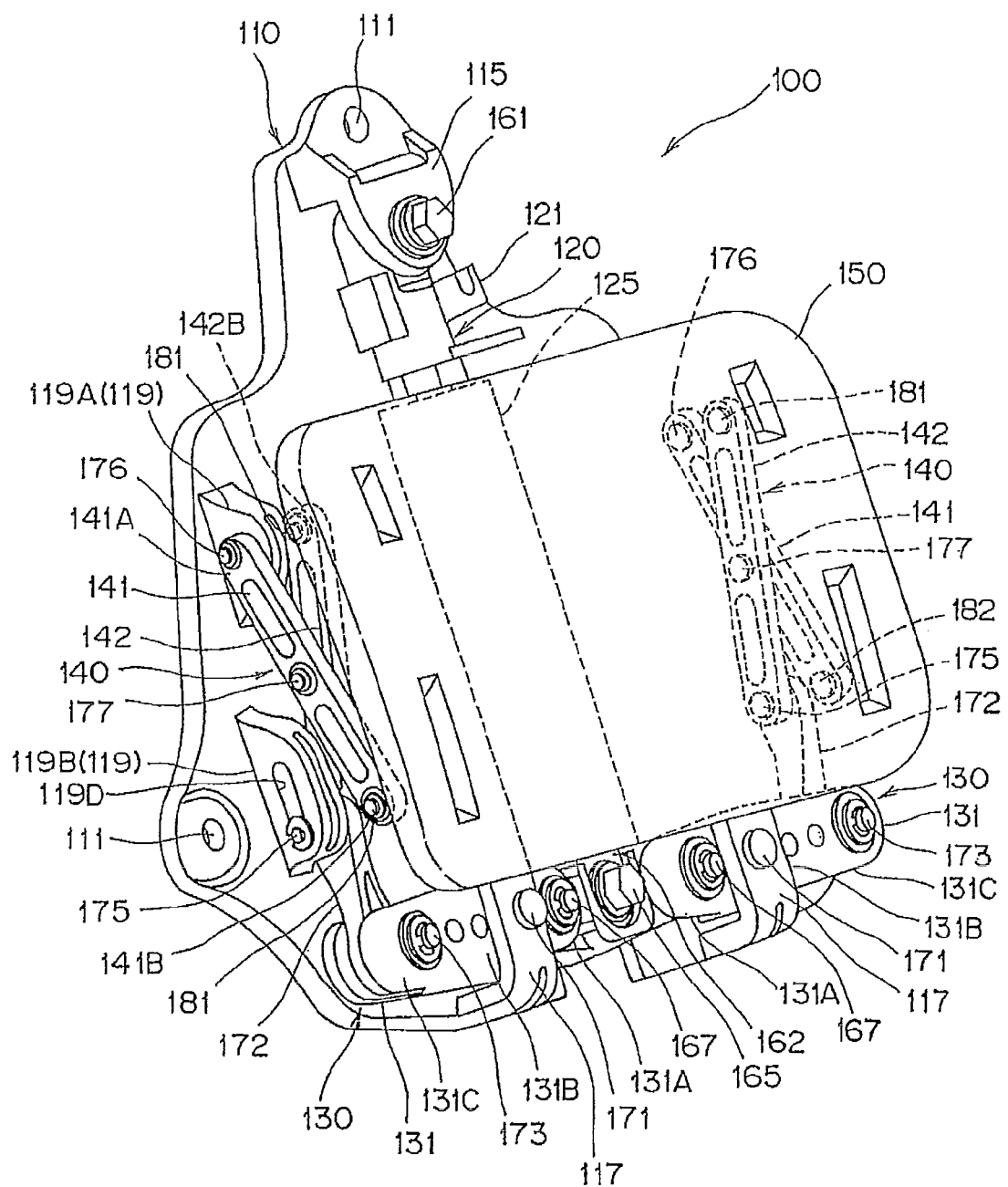
FIG. 6 is a perspective view of the lumbar support mechanism.

FIG. 5 illustrates the lumbar support mechanism 100 along with the seat back 23C. FIG. 6 is a perspective view of the lumbar support mechanism 100.

The lumbar support mechanism 100 includes a base plate 110 removably attached to the vehicle; a damper 120 having an upper end supported by the base plate 110 and a lower end capable of extension and contraction; and a pair of left and right seesaw links 130 coupled to the lower end of the damper 120 and vertically swung in response to the extension and contraction of the damper 120. The lumbar support mechanism 100 further includes a pair of left and right X-shaped pantograph links 140 coupled to the respective seesaw links 130 and extending and contracting in the back and forth direction of the vehicle body in conjunction with the swinging of the seesaw links 130; and a pad 150 supported at four corners by the pantograph links 140. As illustrated in the figures, the constituent parts of the lumbar support mechanism 100 are attached as one unit i.e. a lumbar support unit to the front surface side (the front side surface of the vehicle body) of the base plate 110 (particularly see FIG. 6). This unit is fastened to the seat back plate 71 of the seat back 23C from the rear by means of fastening members (not illustrated) such as bolts so that it can be easily removably secured to the seat back 23C.

Figure 7:
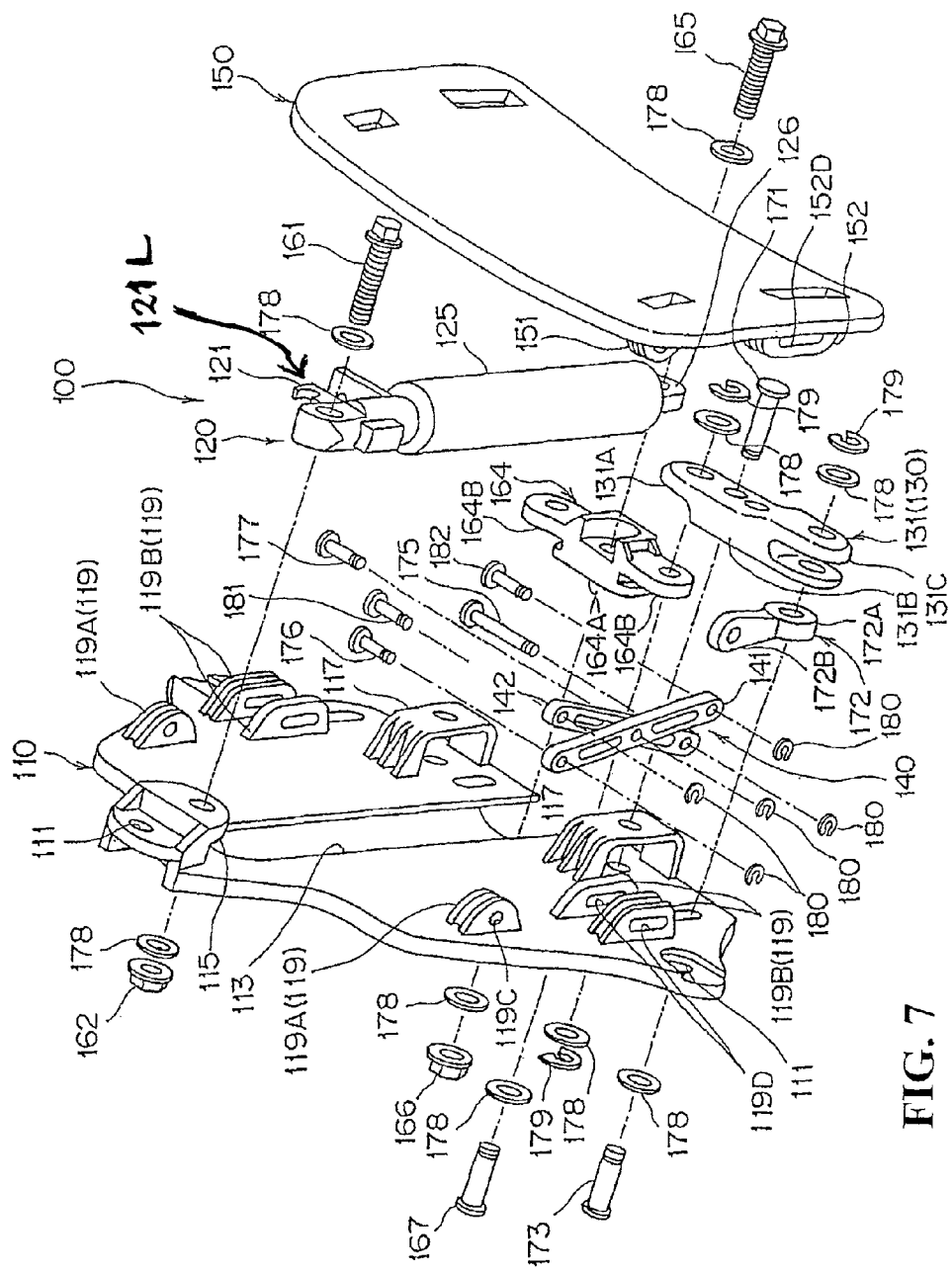
FIG. 7 is an exploded perspective view of the lumbar support mechanism.

As illustrated in FIGS. 7 to 10(B), since the lumbar support mechanism 100 is configured symmetrically, one side of the symmetrical portion is detailed. In addition, FIG. 7 illustrates the right structure of the vehicle body in detail.

The damper 120 incorporates a lock mechanism 121L for locking the extension and contraction of the damper 120. A lock operation member 121 operative in conjunction with the lock mechanism 121L is exposed to the outside at the upper portion of the damper 120 (FIGS. 7 and 8(A)). As illustrated in FIG. 5, a lock-release lever 123 is connected to the lock operation member 121 via a cable 122. The lock-release lever 123 is operatively provided below the front lid 61A of the trunk pocket 61 on the left side of the vehicle.

More specifically, the damper 120 is brought into the state where the lock mechanism 121L is locked in the normal state (the non-operation state) where an external force is not applied to the lock operation member 121. If the lock-release member 123 is operated (raising operation), the lock-operation member 121 is operated via the cable 122 to release the lock of the lock mechanism 121L, that is, the lock is released during such an operational state. In addition, as illustrated in FIG. 5 an operational knob 61B is provided on the front lid 61A of the trunk pocket 61 to open and close the front lid 61A.

As illustrated in FIG. 7, the damper 120 has an elongated cylinder structure where a rod (not illustrated) is accommodated into a tubular case 125 functioning as a cylinder. In addition, the damper 120 is a free-lock damper where a spring mechanism (not illustrated) such as a biasing spring biasing the rod toward the outside of the case and a lock mechanism 121L capable of locking the rod in any position.

As illustrated in FIGS. 7 and 8, the base plate 110 is a generally plate-like resin component formed to have a vertical length substantially equal to that of the damper and width not greater than that of the seat back 23C. In addition, the base plate 110 is formed at left and right portions and at an upper end with through-holes 111 adapted to receive bolts passed therethrough when the base plate 110 is secured to the seat back plate 71.

As illustrated in FIG. 7, the base plate 110 includes a damper concave portion 113, a damper upper end support portion 115, a pair of left and right seesaw link support portions 117, and a pair of left and right pantograph link support portions 119. The damper concave portion 113 vertically extends along its left-right center and is adapted to receive a portion (the tubular case 125) of the damper 120 inserted thereinto to position the damper 120. The damper upper end support portion 115 is adapted to support the upper end of the damper 120 at the upper portion of the left-right center by means of bolts. The seesaw link support portions 117 are provided at the left and right positions of the extending-contracting lower end of the damper 120 to swingably support seesaw link members 131 of the seesaw links 130. The pantograph link support portions 119 are adapted to operatively support the pantograph links 140.

More specifically, the damper 120 is secured to the damper upper end support portion 115 of the base plate 110 via a flange bolt 161 and a nut 162 to position the upper and lower portions of the damper 120. In this secured state, the damper 120 is fitted into the damper concave portion 113 to restrict its left-right movement.

A link connection member 164 (see FIG. 7) is secured to the lower end of the damper 120, i.e., the leading end 126 of the rod via a flange bolt 165 and a nut 166 so as to transmit the extension and contraction of the damper 120 to the seesaw links 130. This link connection member 164 is a resin component integrally formed with pin insertion portions 164B on the left and right of a bolt insertion portion 164A adapted to receive the bolt 165 inserted thereinto. A pin insertion portion 131A formed at one end of the seesaw link member 131 is connected to each of the pin insertion portions 164B via a pin 167 inserted thereinto in the general back and forth direction of the vehicle body.

The seesaw link member 131 is a resin component swingably supported at its intermediate portion 131B by the left and right seesaw link support portions 117 via pins (pins inserted into in the general back and forth direction) 171 serving as a swing fulcrum (see FIG. 7). With this, the seesaw links 130 are configured each of which is swung in the vertical direction of the vehicle body with the pin 171 serving as the swing fulcrum in response to the extension and contraction of the damper 120.

Figures 8A, 8B:
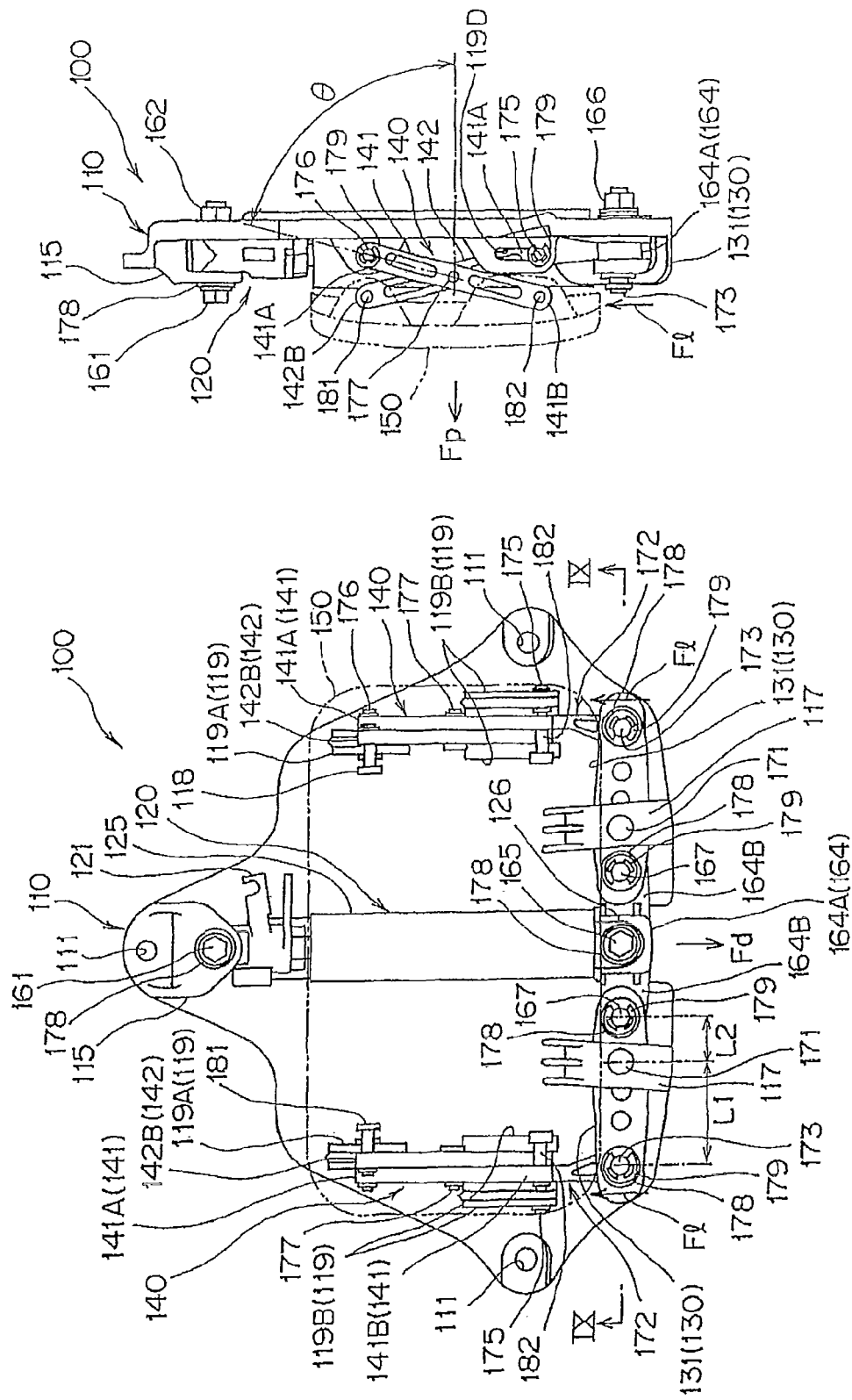
FIG. 8(A) is a plan view of the lumbar support mechanism (when the pad is mostly retreated)
FIG. 8(B) is a lateral view of the lumbar support mechanism.
Figure 9:
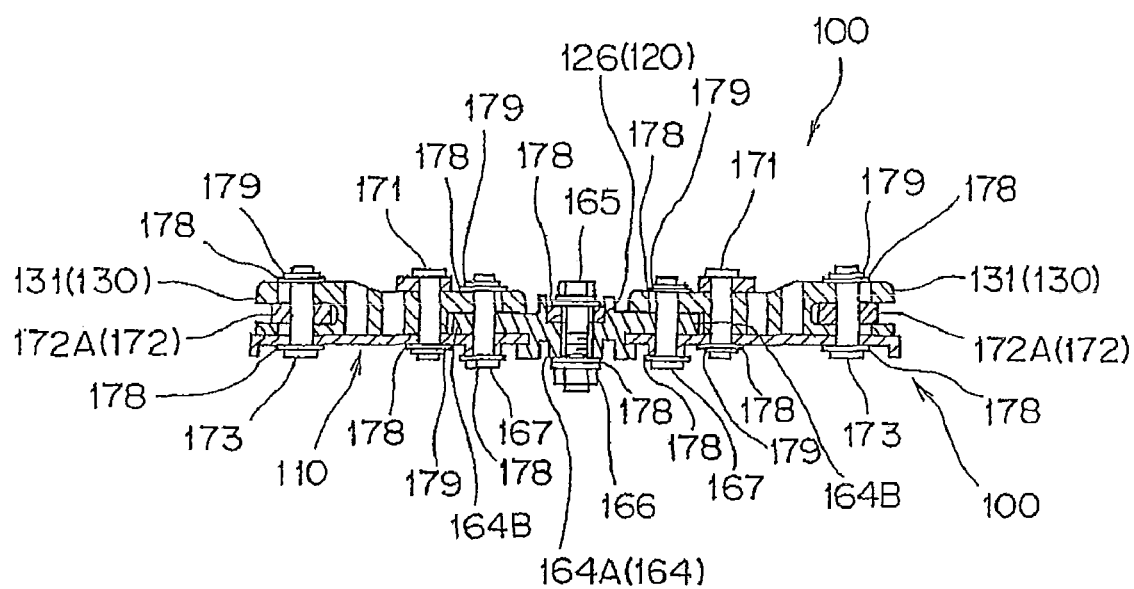
FIG. 9 is a cross-sectional view taken along line IX-IX of FIG. 8(A)

As illustrated in FIGS. 7, 8(A) and 9, the seesaw link member 131 is a horizontally long resin component extending widthwise externally of the base plate 110 from one end (the pin insertion portion 131A) close to the damper 120 and formed integrally with the pin insertion portion 131C at the other end. A lower pin insertion portion 172A is turnably connected to the pin insertion portion 131C via a pin (the pin inserted in the general back and forth direction of the vehicle body) 173. The lower pin insertion portion 172A is formed at the lower end of a link connection member 172 (see FIG. 7) adapted to transmit the movement of the seesaw link 130 to the pantograph link 140.

The link connection member 172 is a vertically long resin component which extends upward along the base plate 110 from the lower pin insertion portion 172A and which is provided integrally with an upper pin insertion portion 172B, adapted to receive a pin 175 insertable thereinto, with a major axis extending in a direction (corresponding to the left-right direction of the vehicle body) perpendicular to the pin insertion direction (corresponding to the back and forth direction of the vehicle body) of the lower pin insertion portion 172A.

In addition, all the operating components from the damper 120 to the seesaw link member 131 operate with the pins 167, 171 and 173 inserted in the back and forth direction of the vehicle body serving as a turning fulcrum or swing fulcrum and do not shift in the back and forth direction of the vehicle body. In this way, there is no back and forth shifting member at a portion from the damper 120 to the seesaw link member 131. Therefore, the pad 150 can be disposed close to the base plate 110 accordingly so that the lumber support mechanism 100 can be made thin.

A description will next be given of the pantograph link 140 along with the peripheral configuration thereof.

As illustrated in FIG. 7, the pantograph link 119 provided on the base plate 110 is composed of a pair of upper and lower link support portions (hereinafter, the upper portions are called the upper link support portions 119A and the lower portions are called the lower link support portions 119B) provided in the vicinities of the left and right edge portions of the base plate 110.

The upper link support portions 119A project toward the front side of the vehicle body from the base plate 110 and are each formed as a pin insertion portion having a generally perfect-circular hole portion 119C adapted to receive a pin 176 insertable therethrough along the width direction of the base plate 110. In addition, the upper link support portion 119A turnably supports a proximal end (the end located on the rear side of the vehicle body) 141A of one of a pair of bar-like link members 141 and 142 pin-connected to each other to constitute the pantograph link 140 with the pin 176 serving as a fulcrum (see FIGS. 8(A) and 8(B)).

As illustrated in FIG. 7, the lower link support portions 119B project toward the front side of the vehicle body from the base plate 110 and are formed as a pair of left and right pin insertion portions each having a vertically extending long hole 119D adapted to receive a pin 175 insertable therethrough along the width direction of the base plate 110. A proximal end portion (the end portion located close to the rear side of the vehicle body) 142A of the other bar-like link member 142 and an upper pin insertion portion 172B of the link connection member 172 pin-connected to the above-mentioned seesaw link member 131 are interposed between the left and right pin insertion portions. In this way, the proximal end portion 142A and the upper pin insertion portion 172B are supported by the single pin 175 passed through the long hole 119D so as be vertically-movable and turnable (see FIGS. 8(A) and 8(B)).

With this configuration, if the extension and contraction of the damper 120 swings the seesaw link members 131, the proximal end portion 142A of the other bar-like link member 142 is moved upward and downward. As illustrated in FIGS. 8 and 10, this changes a cross angle (hereinafter the angle of the bar-like link members 141 and 142 relative to the base plate 110 is described as the angle θ) between the pair of bar-like link members 141 and 142 whose intermediate portions are connected to each other with the pin. Thus, the pair of bar-like link members 141 and 142 is extended and contracted in the back and forth direction in a pantograph manner.

Figures 10A, 10B:
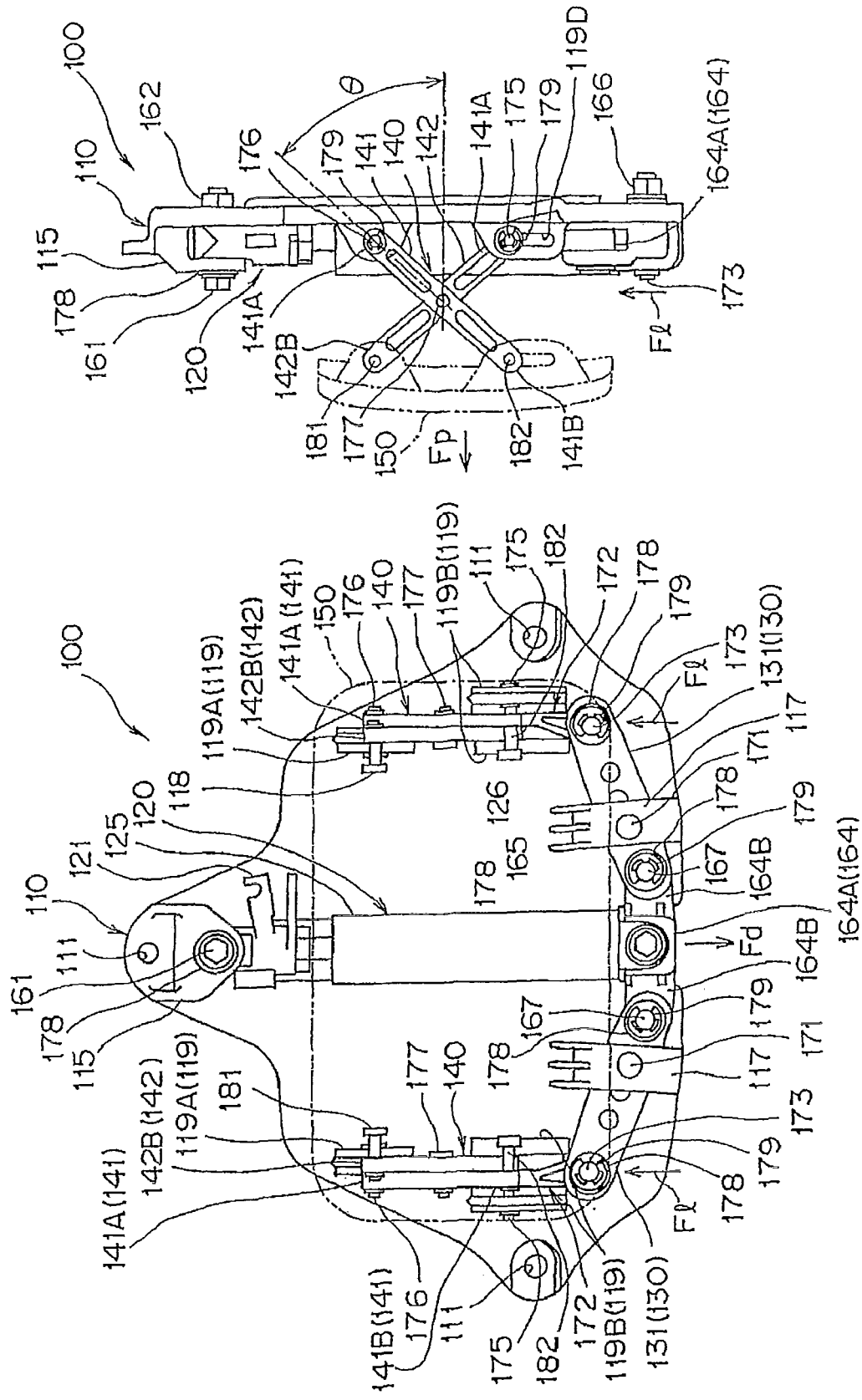
FIG. 10(A) is a plan view of a lumbar support mechanism (the pad is mostly advanced)
FIG. 10(B) is a lateral view of the lumbar support mechanism.

More specifically, the damper 120 may be extended to shift the proximal end portion 142A of the other bar-like link member 142 from the lower position (see FIG. 8(B)) to the upper position (see FIG. 10(B)) in the long hole 119D via the pin 175. In such a case, the pantograph link 140 extends in the front direction of the vehicle body with respect to the base plate 110 (see FIG. 10(B)). Reversely, the damper 120 may be contracted to shift the proximal end portion 142A of the other bar-like link member 142 from the upper position (see FIG. 10(B)) to the lower position (see FIG. 8(B)) in the long hole 119D via the pin 175. In such a case, the pantograph link 140 is contracted in the rear direction of the vehicle body with respect to the base plate 110 (see FIG. 8(B)).

The leading end portions (the ends located opposite the proximal end portions) 141B, 142B of the pair of bar-like link members 141 and 142 are pin-connected to the pair of upper and lower link connecting portions 151 and 152 integrally provided on the right and left portions of the pad 150.

Both the pair of upper and lower link connecting portions 151 and 152 project toward the base plate 110. Generally similarly to the upper link support portion 119A mentioned above, the upper link connecting portion 151 is formed as a pin insertion portion adapted to receive a pin 181 inserted therethrough in the width direction of the base plate 110. The leading end portion 142B of the other bar-like link member 142 is turnably connected to the upper link connecting portion 151 with the pin 181 serving as a fulcrum.

Generally similarly to the lower link support portion 119B mentioned above, the lower link connecting portion 152 is formed as a pin insertion portion having a long hole 152D which extends in the width direction of the base plate 110 and is adapted to allow the pin 182 to be shiftable in the vertical direction (corresponding to the vertical direction of the vehicle body) of the base plate 110. The leading end portion 141B of the one bar-like link member 141 is turnably connected to the lower link support portion 119B via the pin 182 inserted through the long hole 152D in a vertically movable and turnable manner.

More specifically, the link connecting portions 151 and 152 provided on the pad 150 are formed to be connectable without disturbing the extension and contraction of the pantograph link 140. They are adapted to shift the pad 150 in the back and forth direction of the vehicle body in accordance with the extension and contraction of the pantograph link 140. In the present embodiment, the bar-like link members 141 and 142 are formed to have a substantially equal length and the respective intermediate portions connected to each other by means of the pin 77. Thus, the pad 150 is parallel moved in the back and forth direction of the vehicle body according to the extension and contraction of the pantograph links 140.

In addition, the length and pin-connection position of the bar-like link members 141 and 142 are not limited to the above-mentioned length and position. The bar-like link members 141 and 142 may be changed in length with each other and the pin-connection position may be adjusted. This can change the inclination of the pad 150 or vary the inclination in conjunction with the back and forth movement.

Washers 178 are disposed between the flange bolts 161 and 165 and the nuts 162 and 166 and are inserted through the pins 167, 171, 173 and 175 to 177. In addition, locking rings 179 and 180 (E-rings) are used to prevent the coming-off of the pins. More specifically, the locking ring 179 is a locking ring used to lock the pins 167, 171 and 173 having a relatively large diameter for the seesaw link 130. The locking ring 180 is a locking ring used to lock the pins 175, 176, 181 and 182 and includes a relatively small diameter for the pantograph link 140.

With the configuration described above, if the lock-release lever 123 (see FIG. 5) is operated to release the lock of the damper 120, the extension-contraction force (also called the reaction force) of the damper 120 biases one end side of the seesaw link 130 downwardly. This biasing force acts as a force adapted to swing the seesaw link 130 around the swing fulcrum (the pin 171) and to shift the other end (131 side) of the seesaw link member 131 upwardly. This force is converted into a force adapted to extend the pantograph links 140 toward the front side of the vehicle body and bias the pad 150 in the front direction of the vehicle body. Thus, the pad 150 is biased in the front direction of the vehicle body in the seat back 23C.

Figure 11:
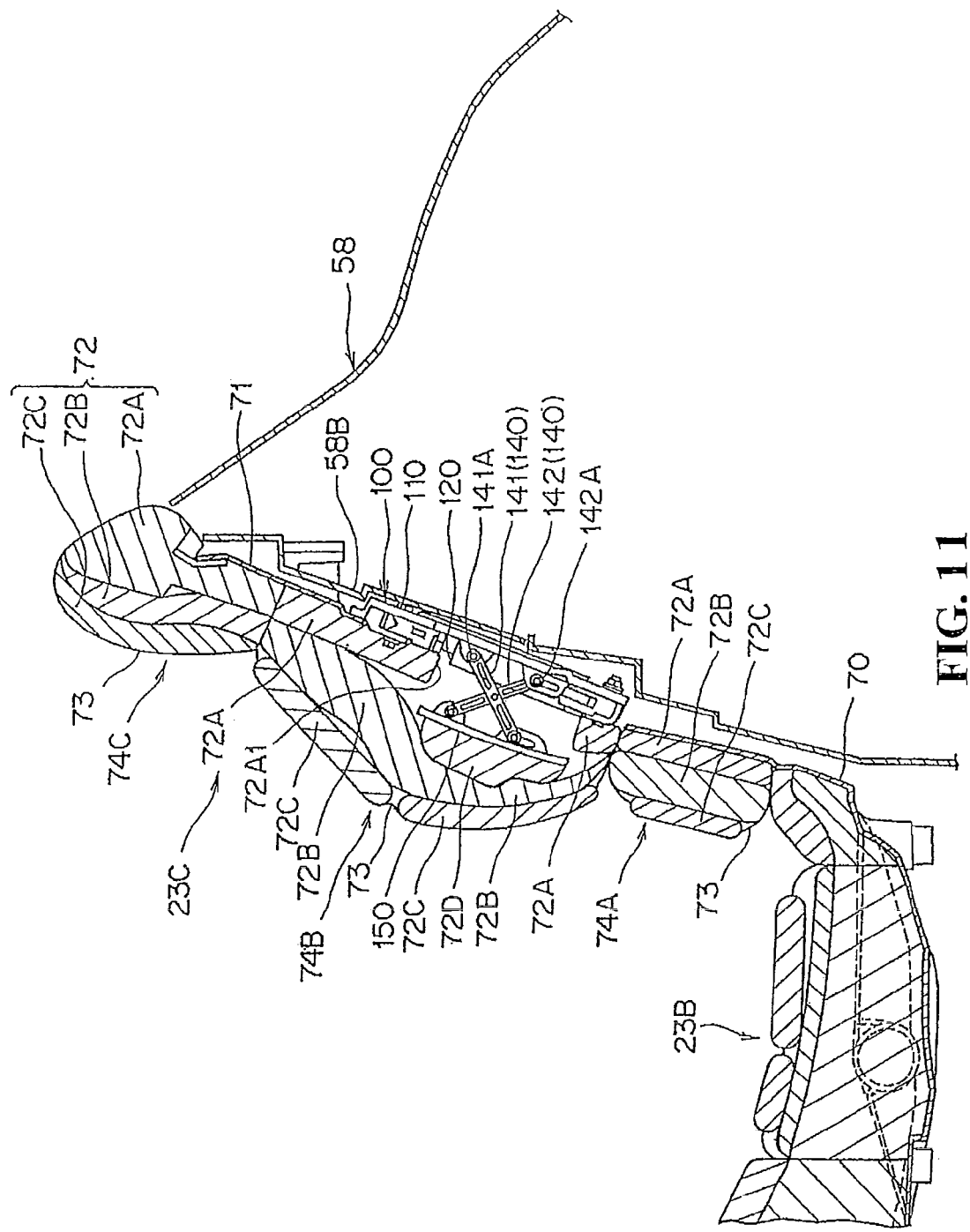
FIG. 11 illustrates the inner structure of the seat back (a state of the lumber support mechanism whose pad is most advanced) along with its peripheral configuration.

FIG. 4 described above illustrates the lumbar support mechanism 100 whose pad is mostly retreated; FIG. 11 illustrates the lumber support mechanism 100 whose pad is mostly advanced.

As illustrated in FIGS. 4 and 11, if the pad 150 is biased in the front direction of the vehicle body in the seat back 23C, the biasing force of the pad 150 is applied to the pillion passenger sitting on the rear seat 23B via the cushion material 72 including the divided urethane 72D located at the front position of the pad 150. With this, while remaining sitting, the pillion passenger appropriately presses her or his body against the seat back 23C to apply a reactive force to the pad 150. In this way, the position of the pad 150 can be adjusted into any position between the pad's most retreated position (see FIG. 4) and the pad's most advanced position (see FIG. 11). If the operation of the lock-release lever 123 is stopped (the hand is released) at the adjusted position, the damper 120 can be locked to fix the pad 150 at that position.

That is to say, in the present embodiment, the extension and contraction force of the damper 120 is transmitted to the X-shaped pantograph links 140 via the seesaw links 130. The pantograph links 140 shift the pad 150 provided on the seat back 23C in the back and forth direction. In this way, if the damper 120 is locked, the swing of the seesaw links 130 is locked, which locks the upper and lower positions of the proximal end portion 142A of the other bar-like link member 142, connected to the seesaw link 130, of the pair of bar-like link members 141 and 142 constituting the X-shaped pantograph link 140.

If the upper and lower positions of the proximal end portion 142A of the other bar-like link member 142 are locked in this way, the cross angle of the pair of bar-like link members 141 and 142 is uniquely determined so that the angle θ of the bar-like link members 141 and 142 is uniquely determined with respect to the base plate 110. Thus, the extension and contraction of the pantograph link 140 are restricted to restrict the movement of the pad 150.

In the present configuration, if the damper 120 is locked, the operation of the seesaw links 130 and of the pantograph links 140 is locked. Therefore, also the pad 150 supported by the pantograph links 140 can be fixed so that the pad 150 is not moved even if a strong force is applied thereto. In addition, since the pad 150 is supported at four point, i.e., at upper, lower, left and right points, by the X-shaped pantograph links 140, the inclination of the pad 150 can be prevented so that the support strength of the pad 150 can sufficiently be ensured.

In addition, if the pad position (the support position) is adjusted, it is necessary for the user (the occupant) to press back the pad 150 at her or his own lumbar against the biasing force of the damper 120. It is desirable that user's pad pressing-back load F fall within the range of a load (e.g. 100 N or less) that assumes the general users. However, if a damper 120 has to be selected to realize the load F thus assumed, a desired damper may not be commercially available in some cases. In order to deal with this, if commercially available dampers are remodeled or dampers are newly designed, labor hours and costs are increased.

To solve such a problem, in the lumber support mechanism 100 of the present embodiment, the damper 120 is not selected but the link mechanism is designed according to the extension and contraction force of the existing damper 120 (hereinafter, called the extension and contraction force Fd). More specifically, based on the pantograph angle (the above-mentioned angle θ) of the pantograph link 140 and the ratio of the seesaw link 130, force Fp transmitted from the damper 120 to the pad 150 is set at the user's pad pressing-back load F (100 N or less).

A description is hereinafter given of an example in which the extension and contraction force (also called the reactive force) of the damper 120 is 268 N.

A relation expression between force F1 transmitted from the seesaw link 130 to the pantograph link 140 and force Fp transmitted to the pad 150 is such that $F1 = Fp \times \tan\theta$ . . . Expression (1). In the present configuration, the pantograph angle θ is set at from 49° (when the pad is most advanced) to 76.5° (when the pad is most retreated).

The ratio of the seesaw link 130 between a distance L1 and a distance L2 is set such that 7:3 (=L1:L2). The distance L1 is from one end (the position of the pin 167) of the seesaw link member 131 to the swing fulcrum (the pin 171) and the distance L2 is from the swing fulcrum (the pin 171) to the other end (the position of the pin 173) of the seesaw link member 131. Thus, the relationship between the extension and contraction force fd and the force F1 is made such that fd:F1=7:3 . . . Expression (2).

According to the ratio set as above, the force Fp transmitted to the pad 150 is such that $Fp = 3 \times 268 \text{ N}/(7 \times )\tan 49° = 99.8 \text{ N}$ when the pad is most advanced. In addition, $Fp = 3 \times 268 \text{ N}/(7 \times )\tan 76.5° = 27.6 \text{ N}$ when the pad is most retreated. In short, the force Fp transmitted to the pad 150 can be made not greater than 100 N (within the range from 27.6 N to 99.8 N).

In addition, in fact the extension and contraction force fd of the damper 120 is not a constant value but slightly varies depending on the extension and contraction of the damper 120. In the above description, the calculation is made by regarding the extension and contraction force fd as a constant value (e.g. a value such as the upper limit of the extension and contraction force fd). Thus, desired conditions can be satisfied while reducing a calculation amount.

In fact, even if the range of the pantograph angle θ of the pantograph link 140 is set, changing the ratio of the seesaw link 130 varies the range of the pantograph angle θ. Therefore, by appropriately adjusting both within the condition range satisfying the corresponding relationship, conditions are obtained in which the force Fp transmitted to the pad 150 fall within the range of the user's pad pressing-back load F.

However, in this case, it is obviously essential that the range of the pantograph angle θ satisfies all the specification conditions needed by the lumbar support 100. The specification conditions include e.g. the fore-aft shift amount of the pad 150 satisfying predetermined conditions and the dimensions of the lumber support mechanism 100 accommodated in the seat back 23C.

Only the adjustment between the pantograph angle θ and the ratio (the ratio of the seesaw link 130) may not bring the force Fp transmitted to the pad 150 into the range of the pad pressing-back load F. In such a case, the dimensions of the members of the seesaw link 130 and of the pantograph link 140 are reviewed and changed. Then, it is needed only to adjust the pantograph θ and the ratio based on the dimensions after the change. The review of the dimensions involves e.g. the change of the dimension of the seesaw link member 131 and of the pair of bar-like link members 141 and 142.

Performing such work can configure a desired link mechanism tailored to fit the existing damper 120 without the selection of the damper 120.

As described above, the lumber support mechanism 100 of the present embodiment includes the damper 120 having one end supported by the inside of the seat back 23 and the other end capable of extension and contraction; the pair of left and right seesaw links 130 each having one end connected to the other end, capable of extension and contraction, of the damper 120, the intermediate portion supported at the swing fulcrum by the seat back 23C, and the other end extending in the width direction of the seat back 23C, and swung around the swing fulcrum; and the pair of left and right X-shaped pantograph links 140 connected to the respective seesaw links 130 and being movable up and down in the back and forth direction in conjunction with the swing of the corresponding seesaw links 130. In the stage of adjusting the support position, the lock-release lever 123 for releasing the lock mechanism of the damper 120 is operated to release the lock mechanism of the damper 120. The extension and contraction force of the damper 120 is transmitted to the pantograph links 140 via the corresponding seesaw links 130. The pantograph links 140 shift the pad 150 provided in the seat back 23C in the back and forth direction. Thus, also in the motorcycle 10, the lumbar support position can be adjusted so as to fit the occupant, thereby improving the occupant's comfort.

With this configuration, if the damper 120 is locked, the operation of the seesaw links 130 and of the pantograph links 140 is fixed to fix also the pad 150 supported by the pantograph links 140. It is possible, therefore, to prevent the undesirable movement of the pad 150. In addition, the damper 120 is not selected but the angle θ and ratio of each link mechanism is set according to the extension and contraction force fd of the existing damper 120. Therefore, it is not necessary to remodel the commercially available damper and also to newly design the damper 120.

The extension and contraction force of the damper 120 is transmitted to the left and right pantograph links 140 via the pair of left and right seesaw links 130 extending in the width direction of the seat back 23C. Therefore, the seesaw links 130 each having the relatively small number of parts are used to achieve easy and reliable power transmission between the damper 120 and the pantograph links 140. In this case, a seesaw link 130 is provided that has a small size in the thickness direction (the back and forth direction of the vehicle body) of the seat back 23C. Therefore, the lumbar support mechanism 100 can be thinned accordingly.

Also the pair of left and right pantograph links 140 can be configured to have a small width (the length in the width direction of the seat back 23C). Therefore, it is also possible to reduce the width of the lumbar support mechanism 100.

Accordingly, the small-sized lumbar support mechanism 100 can be provided that is suitable for relatively small and lightweight vehicles (including the so-called saddle-ride type vehicles) such as motorcycles.

In addition, the present invention may be used with relatively small and lightweight vehicles other than motorcycles include not only scooter-type, cruiser-type and the other types of motorcycles but also three-wheeled vehicles and four-wheeled vehicles classified as ATVs (all terrain vehicles), MUVs (multi-utility vehicles), and golf carts.

In the present configuration, the lumbar support mechanism 100 is supported by the base plate 110, which is removably attached to the vehicle. Therefore, it is easy to assemble the constituent parts of the lumbar support mechanism 100. In addition, it is also easy to attach and remove the lumbar support mechanism 100 to and from the vehicle by attaching and removing the base plate 110. This configuration facilitates the option setting and type-setting relative to the presence or absence of the lumbar support mechanism 100. In addition, it is easy to add the lumbar support mechanism 100 to a vehicle that has not been equipped therewith.

In the present configuration, the lumbar support mechanism 100 is provided on the seat back plate 71. Therefore, it is possible to reduce component parts required for attachment of the lumbar support mechanism 100 according to the use of the seat back plate usually possessed by the vehicle equipped with a seat. In addition, the lumbar support mechanism 100 can be attached to any vehicle.

In the present configuration, the lumbar support mechanism 100 is provided forward of the front wall 58B of the trunk 58. Therefore, the space forward of the trunk 58 can be used to dispose the lumbar support mechanism 100 therein. In addition, the lumbar support mechanism 100 can be attached to small-sized and lightweight vehicles such as motorcycles having less layout space. Further, since the rear of the lumbar support mechanism 100 is shielded by the trunk 58, the external appearance design of the vehicle is not almost affected.

In the present configuration, the lumbar support mechanism 100 is provided in the seat back 23C of the rear seat 23B (the passenger seat). In addition, the lock-release lever 123 is provided below one of the front lids 61A of the trunk pockets 61 provided on the right and left of the seat back 23C in such a manner so as to be operable by the occupant sitting on the rear seat 23B. Therefore, the lock-release lever 123 can be operated by the occupant sitting on the seat, i.e., without the occupant's dismounting from the vehicle. In other words, the lock-release lever 123 is located at a position reached by the hand of the occupant sitting on the rear seat 23B; therefore, the occupant remaining sitting on the seat can release the lock and adjust the pad position by the occupant's hips pressing against or back the pad 150. Thus, the operability of the lock-release lever 123 is superior. Since the operating force required to release the locking of the damper 120 of the present configuration is made constant, also the operating force for the lock-release lever 123 operated via the cable is constant irrespective of the locking position, which provides operability.

In addition, the lock-release lever 123 is not positionally limited to the position of the trunk pocket 61; it needs only to be provided in the vicinity of the grab rail 59. The grab rails 59 are provided at a position where the occupant sitting on the rear seat 23B can easily grab them. If the lock-release lever 123 is provided in the vicinity of one of the grab rails 59, the occupant remaining sitting on the seat can release the lock and her or his hips can adjust the position of the pad 150. Thus, the excellent operability can be ensured.

Further, in the present configuration, the damper 120 includes the spring mechanism for pressing out the pad 150 and the lock mechanism; therefore, the number of constituent parts can be reduced compared with the conventional vehicle lumber support mechanism in which the spring mechanism and the lock mechanism are composed of parts other than the damper. In addition, since the damper 120 is a free-lock damper, the support position can be adjusted in a stepless manner by using the extension and contraction force of the free-lock damper.

In the present configuration, the damper 120 is disposed in the longitudinal direction (the vertical direction of the vehicle body) relative to the vehicle body and its extending force is converted into a vehicle body back and forth direction via the link mechanisms (the seesaw links 130 and the pantograph links 140). Therefore, even if the layout space in the back and forth direction and width direction of the vehicle body is a restricted small space, the damper 120 and the link mechanism can be arranged therein. The members constituting the link mechanism of the present configuration are formed of resin parts; therefore, the lumbar support mechanism 100 can be reduced in weight.

The present invention has been described thus far based on one embodiment. However, the invention is not limited to this embodiment but can be design-modified in various ways. For example, the above embodiment is described in which the lumbar support mechanism 100 is provided in the seat back 23C of the rear seat 23B. However, the invention is not limited to this. The lumbar support mechanism 100 may be provided in the seat back 23D of the front seat 23A. The lumbar support mechanism 100 of the present invention can widely be applied to vehicles classified as motorcycles, ATVs, MUVs and golf carts and vehicles similar thereto.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle including a seat on which an occupant sits and a seat back for supporting a back of the occupant, the seat back being internally provided with a lumbar support mechanism capable of adjusting a support position, the lumbar support mechanism comprising:
    a damper having one end supported by an inside of the seat back and the other end capable of extension and contraction;
    a pair of left and right seesaw links, each one of the seesaw links having one end connected to one end of the other seesaw link, each of said pair of left and right seesaw links being capable of rotating with an extension and contraction force of the damper, an intermediate portion supported at a swing fulcrum by the inside of the seat back, and the other end extending in a width direction of the seat back and swinging around the swing fulcrum;
    a pair of X-shaped pantograph links connected to the corresponding seesaw links and being movable up and down in a back and forth direction in conjunction with the swing of the seesaw links; and
    a lock-release lever adapted to release a lock mechanism of the damper;
    wherein in a stage of adjusting the support position, the lock-release lever is operated to release the lock mechanism of the damper, the extension and contraction force of the damper is transmitted to the pantograph links via the corresponding seesaw links, and the pantograph links shift a pad provided in the seat back in a back and forth direction.

2. The lumber support mechanism of a vehicle according to claim 1,
    wherein the lumbar support mechanism is supported by a base plate, and
    the base plate is removably attached to the vehicle.

3. The lumber support mechanism of a vehicle according to claim 2, wherein the lumbar support mechanism is provided forward of a front wall of a trunk.

4. The lumber support mechanism of a vehicle according to claim 2,
    wherein the lumbar support mechanism is provided in the seat back of a passenger seat, and
    the lock-release lever is provided in the vicinity of a grab rail.

5. The lumbar support mechanism of a vehicle according to claim 2, wherein the lumbar support mechanism is provided on a seat back plate.

6. The lumber support mechanism of a vehicle according to claim 5, wherein the lumbar support mechanism is provided forward of a front wall of a trunk.

7. The lumber support mechanism of a vehicle according to claim 5,
    wherein the lumbar support mechanism is provided in the seat back of a passenger seat, and
    the lock-release lever is provided in the vicinity of a grab rail.

8. The lumber support mechanism of a vehicle according to claim 1, wherein the lumbar support mechanism is provided forward of a front wall of a trunk.

9. The lumber support mechanism of a vehicle according to claim 8,
    wherein the lumbar support mechanism is provided in the seat back of a passenger seat, and
    the lock-release lever is provided in the vicinity of a grab rail.

10. The lumber support mechanism of a vehicle according to claim 1,
    wherein the lumbar support mechanism is provided in the seat back of a passenger seat, and
    the lock-release lever is provided in the vicinity of a grab rail.

11. A lumbar support mechanism for use with a seat comprising:
    a damper having one end supported by an inside of a seat back and the other end capable of extension and contraction;
    a left seesaw link having a distal end, an intermediate portion and a proximal end;
    a right seesaw link having a distal end, an intermediate portion and a proximal end;
    said proximal end of said left seesaw link being operatively connected to the proximal end of the right seesaw link and being capable of rotating by an extension and contraction force of the damper, the intermediate portion of the left seesaw link and the intermediate portion of the right seesaw link being supported at a swing fulcrum by the inside of the seat back, and the distal end of the left seesaw link and the distal end of the right seesaw link extending in a width direction of the seat back and swinging around the swing fulcrum;
    a left X-shaped pantograph link connected to the left seesaw link and being movable up and down in a back and forth direction in conjunction with the swing of the left seesaw link;
    a right X-shaped pantograph link connected to the right seesaw links and being movable up and down in a back and forth direction in conjunction with the swing of the right seesaw link; and
    a lock-release lever adapted to release a lock mechanism of the damper;
    wherein when the lock-release lever is manually operated to release the lock mechanism of the damper, the extension and contraction force of the damper is transmitted to the left and right X-shaped pantograph links via the corresponding left and right seesaw links, and the left and right X-shaped pantograph links shift a pad provided in the seat back in a back and forth direction.

12. The lumber support mechanism according to claim 11,
    wherein the lumbar support mechanism is supported by a base plate, and
    the base plate is removably attached to the vehicle.

13. The lumber support mechanism according to claim 12, wherein the lumbar support mechanism is provided on a seat back plate.

14. The lumber support mechanism according to claim 13, wherein the lumbar support mechanism is provided forward of a front wall of a trunk.

15. The lumber support mechanism according to claim 13,
wherein the lumbar support mechanism is provided in the seat back of a passenger seat, and
the lock-release lever is provided in the vicinity of a grab rail.

16. The lumber support mechanism according to claim 12, wherein the lumbar support mechanism is provided forward of a front wall of a trunk.

17. The lumber support mechanism according to claim 12,
wherein the lumbar support mechanism is provided in the seat back of a passenger seat, and
the lock-release lever is provided in the vicinity of a grab rail.

18. The lumber support mechanism according to claim 11, wherein the lumbar support mechanism is provided forward of a front wall of a trunk.

19. The lumber support mechanism according to claim 18,
wherein the lumbar support mechanism is provided in the seat back of a passenger seat, and
the lock-release lever is provided in the vicinity of a grab rail.

20. The lumber support mechanism according to claim 11,
wherein the lumbar support mechanism is provided in the seat back of a passenger seat, and
the lock-release lever is provided in the vicinity of a grab rail.

\* \* \* \* \*